United States Patent
Fujiwara

(10) Patent No.: US 7,873,271 B2
(45) Date of Patent: Jan. 18, 2011

(54) PHOTOGRAPHY APPARATUS AND PHOTOGRAPHY METHOD

(75) Inventor: Shinya Fujiwara, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/569,374

(22) Filed: Sep. 29, 2009

(65) Prior Publication Data

US 2010/0080550 A1   Apr. 1, 2010

(30) Foreign Application Priority Data

Sep. 30, 2008   (JP) .............................. 2008-253926

(51) Int. Cl.
    G03B 41/00   (2006.01)
(52) U.S. Cl. ..................... 396/322; 396/180; 348/371
(58) Field of Classification Search .................. 396/157, 396/322, 180; 348/217.1, 229.1–230.1, 221.1
    See application file for complete search history.

(56) References Cited

U.S. PATENT DOCUMENTS

| | | | |
|---|---|---|---|
| 6,546,203 B2 * | 4/2003 | Hofer .......................... | 396/155 |
| 6,753,920 B1 | 6/2004 | Momose et al. | |
| 7,403,707 B2 * | 7/2008 | Raskar et al. ................ | 396/213 |
| 7,590,344 B2 * | 9/2009 | Petschnigg .................. | 396/155 |
| 2005/0093994 A1 * | 5/2005 | Baron ....................... | 348/222.1 |
| 2007/0165960 A1 * | 7/2007 | Yamada ....................... | 382/254 |

FOREIGN PATENT DOCUMENTS

| | | |
|---|---|---|
| JP | 2006-148591 A | 6/2006 |
| JP | 2008-16862 A | 1/2008 |

OTHER PUBLICATIONS

Richart, Christian "Flash-Exposure High Dynamic Range Imaging: Virtual Photography and Depth-Compensating Flash".*

* cited by examiner

*Primary Examiner*—Christopher E Mahoney
*Assistant Examiner*—Leon W. Rhodes
(74) *Attorney, Agent, or Firm*—Birch, Stewart, Kolasch & Birch, LLP

(57) ABSTRACT

Two photography operations are performed without emitting flash during a second photography operation, to obtain image signals P1 and P2. A flash influence signal value F1 is calculated in image signal P1. A flash influence signal value F2, which is the amount of influence due to flash in the case that flash was emitted during the second photography operation, is calculated based on the differences between the imaging conditions of the first photography operation and the second photography operation and the flash influence signal value F1. An image signal P2", which is an image signal which is estimated to be obtained in the case that flash was emitted during the second photography operation, is obtained by adding flash influence signal value F2 to image signal P2 obtained by the second photography operation. A dynamic range expanded image signal Pc is calculated based on image signal P1 and image signal P2".

15 Claims, 10 Drawing Sheets

PHOTOGRAPHY APPARATUS AND PHOTOGRAPHY METHOD

BACKGROUND OF THE INVENTION

1. Field of the Invention

The present invention is related to a photography apparatus and a photography method that perform a plurality of photography operations under different photography conditions, then processes the image signals obtained by the photography signals to obtain various image signals.

2. Description of the Related Art

CCD's, which are imaging means employed in digital cameras, have narrower dynamic ranges than silver salt film. Therefore, overexposure and underexposure are likely to occur in images photographed by digital cameras. For this reason, there are known techniques for obtaining image signals having expanded dynamic ranges that exhibit favorably reproduction properties over a wide range from high brightness to low brightness. In these techniques, imaging is performed with different exposure conditions to obtain an image signal that represents an image having a large amount of data toward the high brightness side, and an image signal that represents an image having a large amount of data toward the low brightness side, for example, and then the image signals are combined to obtain an expanded dynamic range image signal.

Examples of techniques for obtaining image signals having expended dynamic ranges based on a plurality of image signals are disclosed in U.S. Pat. No. 6,753,920, and Japanese Unexamined Patent Nos. 2006-148591 and 2008-016862.

Generally, in the case that the aforementioned techniques are employed to obtain a dynamic range expanded image data set having a dynamic range which is expanded n times that of an image obtained by standard photography, an image data set, which is photographed with the same amount of exposure as that during standard photography, and an image data set, which is photographed with an exposure amount 1/n times that during standard photography, are required. In the case that the dynamic range is to be expanded to 800% (8 times), for example, an image data set, which is photographed with the same amount of exposure as that during standard photography, and an image data set, which is photographed with an exposure amount ⅛ that during standard photography, are required. That is, it is necessary to decrease the exposure amount compared to that during standard photography, in order to greatly expand the dynamic range.

In the case that the aforementioned techniques are applied to image signals which are obtained while flash is emitted, an image signal obtained by photography with an exposure amount equivalent to that of standard photography with standard flash emission and an image signal obtained by photography with an exposure amount 1/n times that of standard photography with the amount of flash emission suppressed to 1/n become necessary.

However, it is difficult to accurately control the amount of emitted flash along to match set exposure ratios. In a technique that controls the amount of flash emission by changing the amount of flash emission time as disclosed in U.S. Pat. No. 6,753,920, fluctuations in the amount of flash emission occur, and dynamic range expanding processes cannot be performed accurately.

Meanwhile, Japanese Unexamined Patent Publication Nos. 2006-148591 and 2008-016862 are silent regarding control of flash during flash emission.

Further, processes in which a single image signal is generated based on a plurality of image signals is not limited to the dynamic range expanding process. There are various such types of image processes, such as a multi frame process, in which an image having a shallow subject field depth or an image having a deep subject field depth is generated from image signals that represent a plurality of frames. The same problems regarding flash emission apply to these processes as well.

SUMMARY OF THE INVENTION

The present invention has been developed in view of the foregoing circumstances. It is an object of the present invention to provide a photography apparatus and a photography method that perform a plurality of photography operations under different photography conditions with respect to a single subject to obtain a plurality of image signals corresponding to each photography operation, then process the image signal to obtain a single dynamic range expanded image signal, in which a dynamic range expanding process can be performed accurately even in cases that flash is emitted during photography.

A first photography apparatus of the present invention comprises:

imaging means for performing at least two photography operations including a first photography operation and a second photography operation with different photography conditions for a single subject, and obtaining a plurality of image signals corresponding to the plurality of photography operations;

light emitting means, for emitting flash toward the subject;

image signal processing means, for processing the plurality of image signals; and control means, for controlling the imaging means, the light emitting means, and the image signal processing means such that they perform photography operations according to a standard photography method, comprising the steps of:

performing the first photography operation while emitting flash;

performing the second photography operation while preventing the flash from being emitted;

calculating a flash influence signal value F1, which is the amount of influence due to flash emission within an image signal P1 obtained by the first photography operation;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation.

A second photography apparatus of the present invention comprises:

imaging means for performing at least two photography operations including a first photography operation and a second photography operation with different photography conditions for a single subject, and obtaining a plurality of image signals corresponding to the plurality of photography operations;

light emitting means, for emitting flash toward the subject;

image signal processing means, for processing the plurality of image signals; and control means, for controlling the imaging means, the light emitting means, and the image signal processing means such that they perform photography operations according to an overexposure photography method, comprising the steps of:

performing the first photography operation while emitting flash;

performing the second photography operation while preventing the flash from being emitted;

calculating an overexposure amount value W, which is the amount of overexposure due to flash emission within an image signal P1 obtained by the first photography operation;

calculating a flash influence signal value F1, which is the amount of influence due to flash emission within an image signal P1 obtained by the first photography operation, based on the overexposure value W;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation.

A third photography apparatus of the present invention comprises:

imaging means for performing at least two photography operations including a first photography operation and a second photography operation with different photography conditions for a single subject, and obtaining a plurality of image signals corresponding to the plurality of photography operations;

light emitting means, for emitting flash toward the subject;

image signal processing means, for processing the plurality of image signals;

judging means, for judging whether overexposure will occur in an image signal P1 obtained by the first photography operation due to the influence of flash emitted during the first photography operation;

control means, for controlling the imaging means, the light emitting means, and the image signal processing means such that they perform photography operations according to a standard photography method in the case that the judging means judges that overexposure will not occur, and for controlling the imaging means, the light emitting means, and the image signal processing means such that they perform photography operations according to an overexposure photography method in the case that the judging means judges that overexposure will occur.

In the first through third photography apparatuses of the present invention, the image signal processing means may obtain a dynamic range expanded image signal Pc based on the image signal P1 and the image signal P2.

In addition, the imaging means may be an imaging element equipped with a great number of first light receiving elements and second light receiving elements that photoelectrically convert light from subjects, which are capable of being controlled so as to be driven independently from each other and are arranged in a predetermined arrangement.

A first photography method of the present invention is a photography method, for performing at least two photography operations including a first photography operation and a second photography operation with different photography conditions for a single subject, obtaining a plurality of image signals corresponding to the plurality of photography operations, and processing the plurality of obtained image signals according to a standard photography method, comprising the steps of:

performing the first photography operation while emitting flash;

performing the second photography operation while preventing the flash from being emitted;

calculating a flash influence signal value F1, which is the amount of influence due to flash emission within an image signal P1 obtained by the first photography operation;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation.

A second photography method of the present invention is a photography method, for performing at least two photography operations including a first photography operation and a second photography operation with different photography conditions for a single subject, obtaining a plurality of image signals corresponding to the plurality of photography operations, and processing the plurality of obtained image signals according to an overexposure photography method, comprising the steps of:

performing the first photography operation while emitting flash;

performing the second photography operation while preventing the flash from being emitted;

calculating an overexposure amount value W, which is the amount of overexposure due to flash emission within an image signal P1 obtained by the first photography operation;

calculating a flash influence signal value F1, which is the amount of influence due to flash emission within an image signal P1 obtained by the first photography operation, based on the overexposure value W;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation.

A third photography method of the present invention is a photography method, for performing at least two photography operations including a first photography operation and a second photography operation with different photography conditions for a single subject, obtaining a plurality of image signals corresponding to the plurality of photography operations, and processing the plurality of obtained image signals, comprising the steps of:

judging whether overexposure will occur in an image signal P1 obtained by the first photography operation due to the influence of flash emitted during the first photography operation;

performing photography according to a standard photography method in the case that it is judged that overexposure will not occur; and performing photography according to an overexposure photography method in the case that it is judged that overexposure will occur.

In the first through third photography methods of the present invention, a dynamic range expanded image signal Pc may be obtained based on the image signal P1 and the image signal P2".

Note that when the dynamic range expanded image signal Pc is obtained in the first through third photography apparatuses and the first through third photography methods of the present invention, at least the first photography operation and the second photography operations are performed under different photography conditions. The image signals P1 and P2 which are employed to generate the dynamic range expanded image signal Pc. However, the present invention is not limited to only performing two photography operations. A number of photography operations greater than two may be performed, and the image signals obtained thereby may be employed as appropriate.

The "image signal P2", which is an image signal which is estimated to be obtained in the case that flash was emitted during the second photography operation" may be employed in various other types of image processes in addition to the aforementioned process for generating dynamic image expanded image signals. An example of another image process that may employ the image signal P2" is a multi frame process, in which an image having a shallow subject field depth or an image having a deep subject field depth is generated based on image signals that represent a plurality of frames.

According to the first photography apparatus and the first photography method of the present invention, at least two photography operations including a first photography operation and a second photography operation are performed with different photography conditions for a single subject, a plurality of image signals corresponding to the plurality of photography operations are obtained, and the plurality of obtained image signals are processed according to a standard photography method, comprising the steps of: performing the first photography operation while emitting flash; and calculating a flash influence signal value F2, based on the differences between the imaging conditions of the first photography operation and the imaging conditions of the second photography operation and the flash influence signal value F1. Thereby, an image signal which is estimated to be obtained in the case that flash was emitted can be obtained, even in the case that flash is not emitted, without controlling light emission of the flash. Therefore, the image signals can be applied to a various image processes, such as a process for generating expanded dynamic range image signals and a multi frame process for generating an image having a shallow subject field depth or an image having a deep subject field depth based on image signals that represent a plurality of frames, to enable generation of more effective image signals.

According to the second photography apparatus and the second photography method of the present invention, the flash influence signal value of the second photography operation is calculated while taking the overexposure amount value W within the image signal P1 obtained by the first photography operation due to flash emission into consideration. Therefore, generation of more effective image signals is enabled.

According to the third photography apparatus and the third photography method of the present invention, whether overexposure will occur in an image signal P1 obtained by the first photography operation due to the influence of flash emission during the first photography operation is judged. In the case that it is judged that overexposure will not occur, the standard photography method is executed (as in the first photography apparatus and the first photography method). In the case that it is judged that overexposure will occur, the overexposure photography method is executed (as in the second photography apparatus and the second photography method). Thereby, an appropriate process can be selected depending on whether overexposure is present within the image signal P1.

DESCRIPTION OF THE PREFERRED EMBODIMENTS

Figure 1:
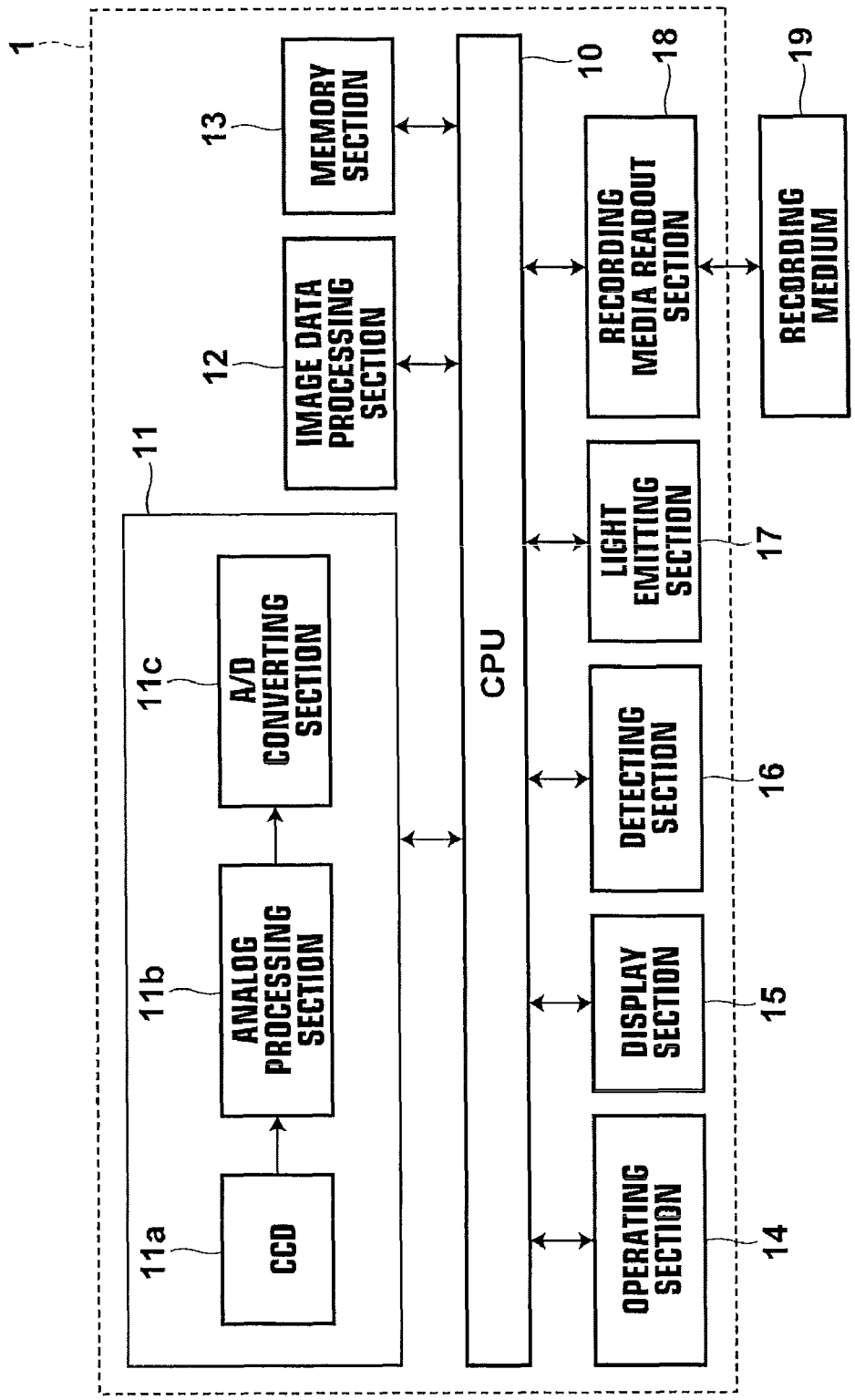
FIG. 1 is a schematic block diagram that illustrates the construction of a digital camera, to which a photography apparatus according to a first embodiment of the present invention is applied.

Hereinafter, embodiments of the present invention will be described with reference to the attached drawings. FIG. 1 is a schematic block diagram that illustrates the construction of a digital camera 1, to which a photography apparatus according to a first embodiment of the present invention is applied.

As illustrated in FIG. 1, the digital camera 1 of the first embodiment is constituted by: a CPU 10; an imaging section 11; an image signal processing section 12; a memory section 13; an operating section 14; a display section 15; a detecting section 16; a light emitting section 17; and a recording media readout section 18.

The imaging section 11 is configured to perform a plurality of photography operations with different photography conditions with respect to the same subject, and to obtain a plurality of image data sets corresponding to each of the photography operations. The imaging section 11 is equipped with: a lens group (not shown); a lens driving section (not shown); a CCD 11a that functions as an imaging element; a CCD driving section (not shown); an analog processing section 11b and an A/C converting section 11c.

Note that the plurality of image data sets of the same subject may be obtained by performing the plurality of photography operations with different photography conditions according to either of the following methods. 1) The plurality of image data sets are obtained by performing photography operations employing a CCD constituted by a great number of first light receiving elements and second light receiving elements that photoelectrically convert light from subjects, which are capable of being controlled so as to be driven independently from each other and are arranged in a predetermined arrangement. 2) The plurality of image data sets are obtained by performing high speed continuous photography using a standard CCD.

The image of the subject which is focused onto the light receiving surface of the CCD 11a is converted into signal charges of intensities corresponding to the intensity of light which is incident on each sensor of the CCD 11a. Note that the CCD has a so called electronic shutter function, by which the amount of charge accumulating time (shutter speed) of each of the sensors is controlled by the timings of shutter gate pulses.

The signal charges which are accumulated in each sensor are sequentially read out from the CCD 11a as voltage signals (analog image signals) corresponding to the signal charges, based on pulses which are output from the CCD driving section. The analog image signals which are output from the CCD 11a are sent to the analog processing section 11b.

The analog processing section 11b includes signal processing circuits such as: a sampling hold circuit; a color separating circuit; and a gain adjusting circuit. The analog processing section 11b administers a correlated double sampling (CDS) process, a color separation process to separate the analog image signals into R, G, and B color signals, and adjustment of the signal levels of each color signal (preliminary white balance process).

The signals output from the analog processing section 11b are converted into digital signals by the A/D converting section 11c, then transmitted to the image data processing section 12. Note that the CCD driving section, the analog processing section 11b and the A/D converting section 11c are synchronized by timing signals output from a timing generator according to commands from the CPU 10.

The image data processing section 12 is constituted by a digital signal processor (DSP) that includes image quality adjusting circuits, such as: a brightness/color difference signal generating circuit; a gamma correcting circuit; a sharpness adjusting circuit; a contrast correcting circuit; and a white balance adjusting circuit, as well as an image combining circuit (image data processing means) for processing at least one of the image data sets from among the plurality of image data sets obtained by photographing the same subject, to obtain a single dynamic range expanded image data set. The image data processing section 12 processes image signals based on commands output from the CPU 10.

The memory section 13 is constituted by a semiconductor memory or the like, and is capable of storing various types of data. The memory section has stored therein a system program for operating the digital camera and the like.

The operating section 14 is constituted by buttons for performing operations and settings, such as a shutter release button 33.

The display section 15 is constituted by a monitor, such as a liquid crystal display and an organic EL display.

The detecting section 16 is constituted by various sensors for detecting subject data and subject field data.

The light emitting section 17 emits flash, and is constituted by a xenon lamp or the like.

The recording media readout section 18 is equipped with an opening (media slot) into which recording media 19 are loaded. When a recording medium 19 is loaded into the media slot, data is read out from and written into the recording medium 19.

Note that the recording media 19 may be an xD Picture Card™, a Smart Media™, a PC card, a Compact Flash™, a magnetic disc, an optical disc, an magnetic optical disc, a Memory Stick™ or the like. Various types of media, from which data can be read out and into which data can be written electronically, magnetically, optically, or by combinations of these methods, can be employed. A signal processing means and an interface corresponding to the type of media which is utilized is applied.

The CPU 10 controls the entirety of the digital camera 1, based on input from the operating section 14. The CPU 10 functions as a readout control means for reading out data stored in the memory section 13 and the recording media 19 according to commands input from the operating section 14. The CPU 10 also functions as an operation control means for controlling zooming operations of the lens driving section, focusing adjustment operations (AF), and automatic exposure adjustment operations (AE). Further, the CPU 10 functions as a display control section for controlling display by the display section 15.

Still further, the CPU functions as a control means, for controlling the imaging section 11, the light emitting section 17 and the image signal processing section 12 to perform photography according to predetermined photography methods, to be described later.

Figure 2A:
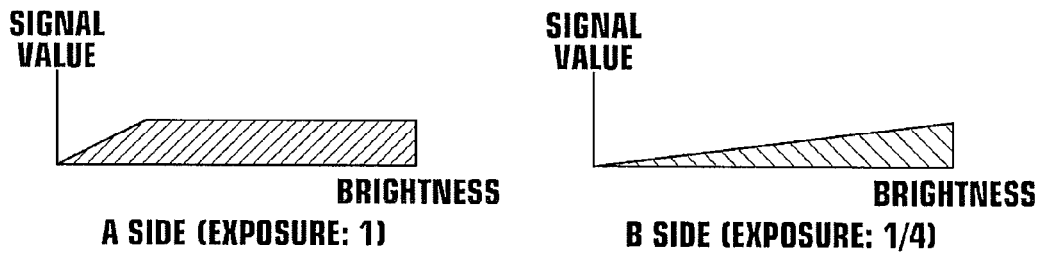
FIGS. 2A, 2B, and 2C are diagrams for explaining how data is processed when dynamic range is expanded.
Figure 2B:
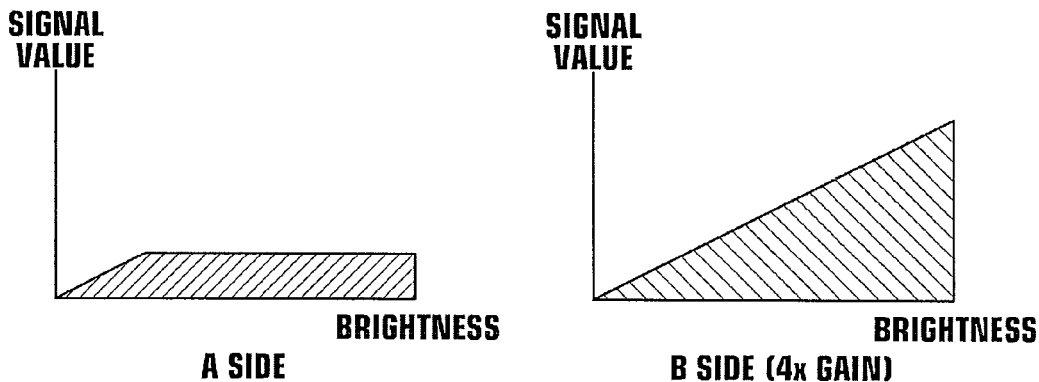
Figure 2C:
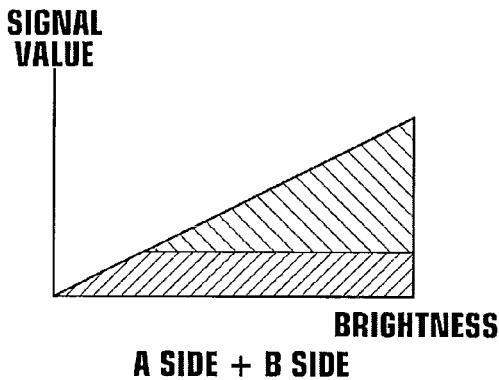
Figure 3:
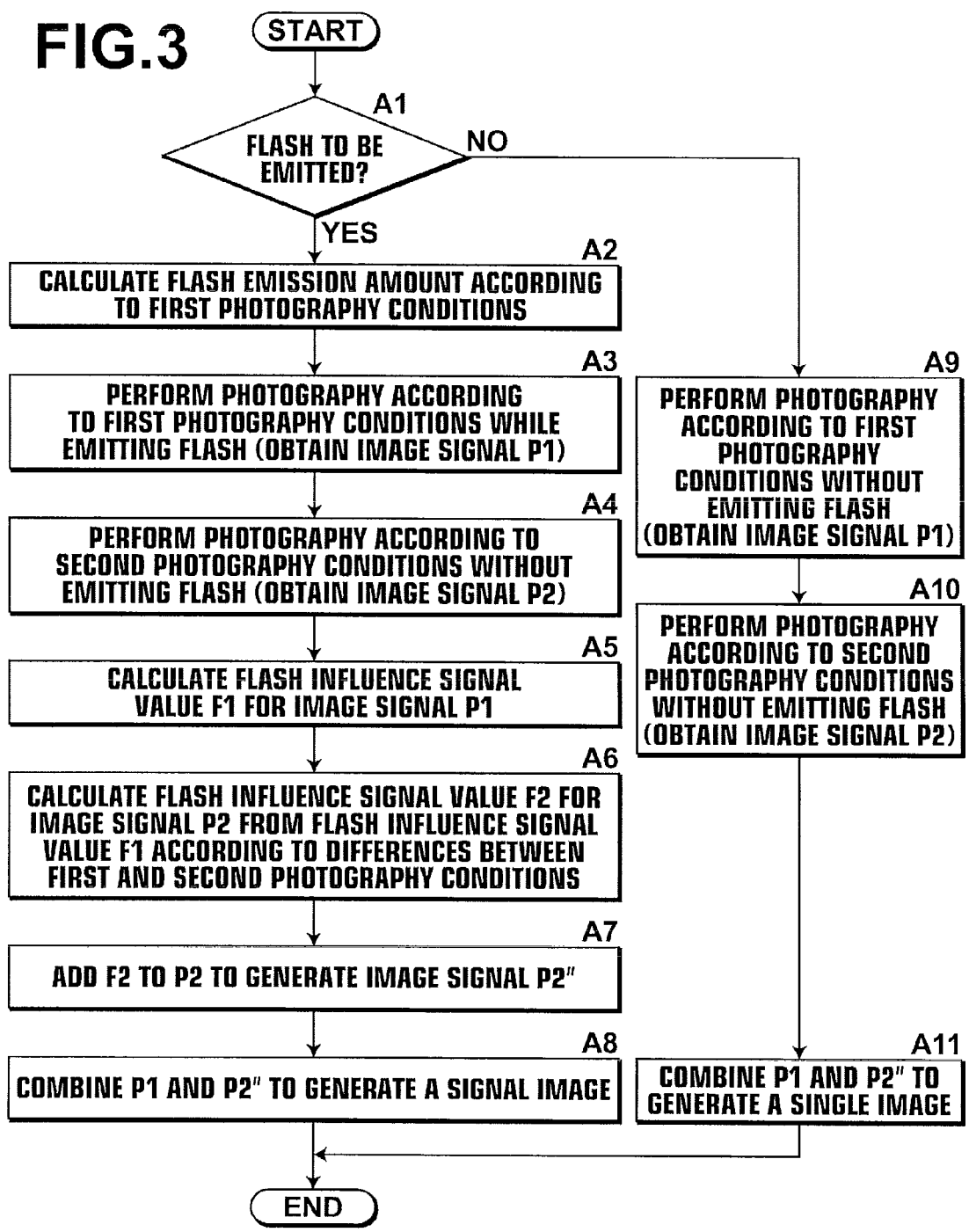
FIG. 3 is a flow chart that illustrates the steps of a process performed by the digital camera of the first embodiment.

Next, the flow of processes which are executed by the digital camera 1 having the configuration described above will be described. FIGS. 2A, 2B, and 2C are diagrams for explaining how data is processed when dynamic range is expanded. FIG. 3 is a flow chart that illustrates the steps of a process performed by the digital camera of the first embodiment.

When photography is initiated, subject data and subject field data are detected by various sensors of the detecting section 16. The CPU 10 sets how much the dynamic range of the image data set to be ultimately obtained is to be expanded from that of an image data set which is obtained by standard photography. Further, the CPU 10 judges whether flash is to be emitted, based on the subject data and the subject field data detected by the detecting section 16 (step A1).

In the case that it is judged that flash is not to be emitted at Step A1, photography is performed according to a non flash emission photography method. Hereinafter, the non flash emission photography method will be described.

First, an exposure ratio which is necessary to obtain a desired dynamic range is determined. Then, two image signals, consisting of an A side image signal, mainly for obtaining data toward the low brightness side, and a B side image signal with a smaller amount of exposure than the A side image signal, mainly for obtaining data toward the high brightness side, are obtained (step A9 and step A10). For example, in the case that the dynamic range is to be expanded by four times, and the exposure of the A side image signal which is photographed with a standard amount of exposure is designated as 1, the exposure of the B side image signal becomes ¼, as illustrated in FIG. 2A. Next, gain correction is performed with respect to the B side image signal at 4 times, in order to cause the slope properties of the A side image signal and the B side image signal to match, as illustrated in FIG. 2B. By combining the data of the A side image signal and the B side image signal such that data of the A side image signal is used as the low brightness side data and data of the B side image signal is used as the high brightness side data, a single dynamic range expanded image signal can be obtained, as illustrated in FIG. 2C (step A1).

In the case that it is judged that flash is to be emitted at Step A1, photography is performed according to a standard photography method. Hereinafter, the standard photography method will be described.

First, an exposure ratio which is necessary to obtain a desired dynamic range is determined (step A2). Then, a first photography operation (to obtain an A side image signal) is performed while emitting flash (step A3). Thereafter, flash is prevented from being emitted, and a second photography operation is performed (step A4).

Next, a flash influence signal value F1, which is the amount of influence due to flash emission within an image signal P1 obtained by the first photography operation, is calculated (step A5). Then, a flash influence signal value F2, which is the amount of influence due to flash emission in the case that flash was emitted during the second photography operation is calculated, based on the differences between the imaging conditions of the first photography operation and the imaging conditions of the second photography operation (exposure ratio) and the flash influence signal value F1 (step A6). Thereafter, an image signal P2", which is an image signal which is estimated to be obtained in the case that flash was emitted during the second photography operation, is obtained by adding the flash influence signal value F2 to an image signal P2 obtained by the second photography operation (step A7).

Finally, the data of the A side (image signal P1) is used as the low brightness side data and data of the B side (image signal P2") is used as the high brightness side data, and the A side data and the B side data are combined in the same manner as that employed in the non flash emission photography method (step A8). Thereby, a dynamic range expanded image signal Pc is obtained, based on the image signal P1 and the image signal P2".

By adopting the configuration described above, fine control of flash emission when flash is to be emitted during photography of images for performing dynamic range expansion processes is obviated. Therefore, dynamic range expansion processes can be accurately performed even in cases that flash emission photography is performed.

Figure 4:
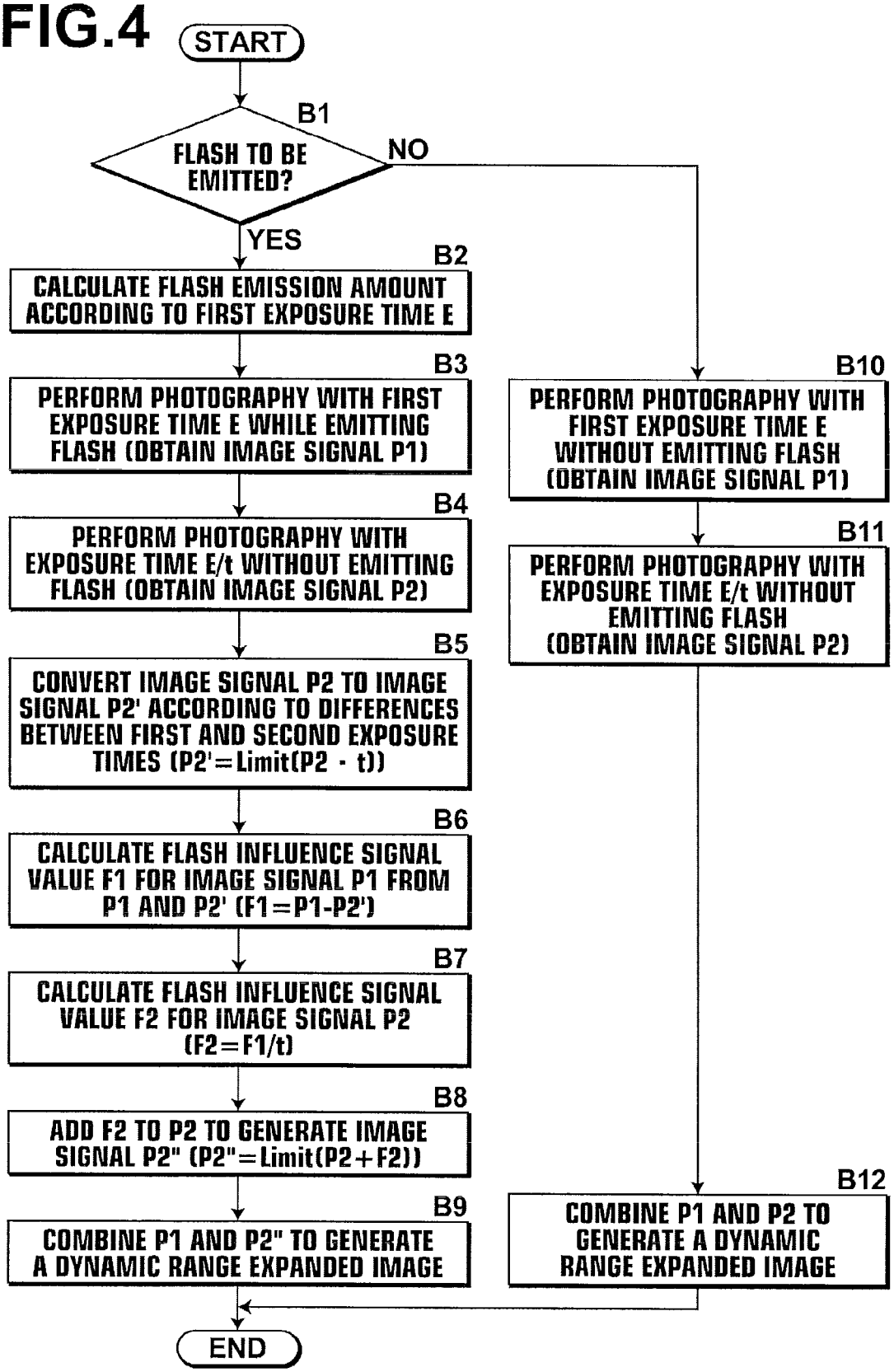
FIG. 4 is a flow chart that illustrates the steps of a process performed by the digital camera according to a second embodiment of the present invention.

Next, a digital camera to which a photography apparatus according to a second embodiment of the present invention is applied will be described. FIG. 4 is a flow chart that illustrates the steps of a process performed by the digital camera of the second embodiment.

The imaging section 11 of the digital camera of the second embodiment is of a different configuration from that of the digital camera of the first embodiment. In addition, the accuracy of the process performed in the standard photography method is improved. Note that the configuration of the digital camera of the second embodiment other than the points described above is the same as that of the digital camera of the first embodiment. Therefore, detailed descriptions of the points other than the differences will be omitted.

The imaging section 11 of the second embodiment performs continuous high speed photography with different exposure times, to obtain an A side image signal, mainly for obtaining data toward the low brightness side, and a B side image signal with a smaller amount of exposure than the A side image signal, mainly for obtaining data toward the high brightness side.

When photography is initiated, subject data and subject field data are detected by various sensors of the detecting section 16. The CPU 10 sets how much the dynamic range of the image data set to be ultimately obtained is to be expanded from that of an image data set which is obtained by standard photography. Further, the CPU 10 judges whether flash is to be emitted, based on the subject data and the subject field data detected by the detecting section 16 (step B1).

In the case that it is judged that flash is not to be emitted at step B1, photography is performed according to a non flash emission photography method. Note that the steps of the non flash emission photography method (steps B10 through B12) are the same as those of the first embodiment, and therefore detailed descriptions thereof will be omitted.

In the case that it is judged that flash is to be emitted at step B1, photography is performed according to a standard photography method. Hereinafter, the standard photography method will be described in detail.

First, an exposure ratio which is necessary to obtain a desired dynamic range is determined (step B2). Then, a first photography operation (to obtain an A side image signal) is performed while emitting flash, with an exposure time E (step B3). Thereafter, flash is prevented from being emitted, and a second photography operation (to obtain a B side image signal) is performed, with an exposure time E/t (step B4).

Next, an image signal P2', which is an image signal which is estimated to be obtained in the case that an image signal P2 was obtained with an exposure time E, is calculated according to the difference in exposure times of the first photography operation and the second photography operation, according to Formula (1) below (step B5).

$$P2'=\text{Limit}(P2 \cdot t) \quad (1)$$

Note that Limit(x) represents a limiting process that imposes a signal limit on x. This process is performed because if light of a predetermined intensity or greater enters an actual CCD, the signal output of the CCD becomes saturated, and in cases that signal values greater than or equal to a saturation amount are generated by calculations, it is not possible to reproduce actual image signals unless the signals are limited.

Next, a flash influence signal value F1, which is the amount of influence due to flash emission within an image signal P1 obtained by the first photography operation, is calculated based on the image signal P1 and the image signal P2' according to Formula (2) below (step B6). Then, a flash influence signal value F2, which is the amount of influence due to flash emission in the case that flash was emitted during the second photography operation is calculated, based on the flash influence signal value F1 according to Formula (3) below (step B7). Thereafter, an image signal P2", which is an image signal which is estimated to be obtained in the case that flash was emitted during the second photography operation, is calculated, based on the flash influence signal value F2 and the image signal P2 according to Formula (4) below (step B8).

$$F1=P1-P2' \quad (2)$$

$$F2=F1/t \quad (3)$$

$$P2''=\text{Limit}(P2+F2) \quad (4)$$

Finally, the data of the A side (image signal P1) is used as the low brightness side data and data of the B side (image signal P2") is used as the high brightness side data, and the A side data and the B side data are combined in the same manner as that employed in the non flash emission photography method (step B9). Thereby, a dynamic range expanded image signal Pc is obtained, based on the image signal P1 and the image signal P2".

In the case that the configuration described above is adopted as well, the same advantageous effects as those obtained by the first embodiment can be obtained.

Figure 5A:
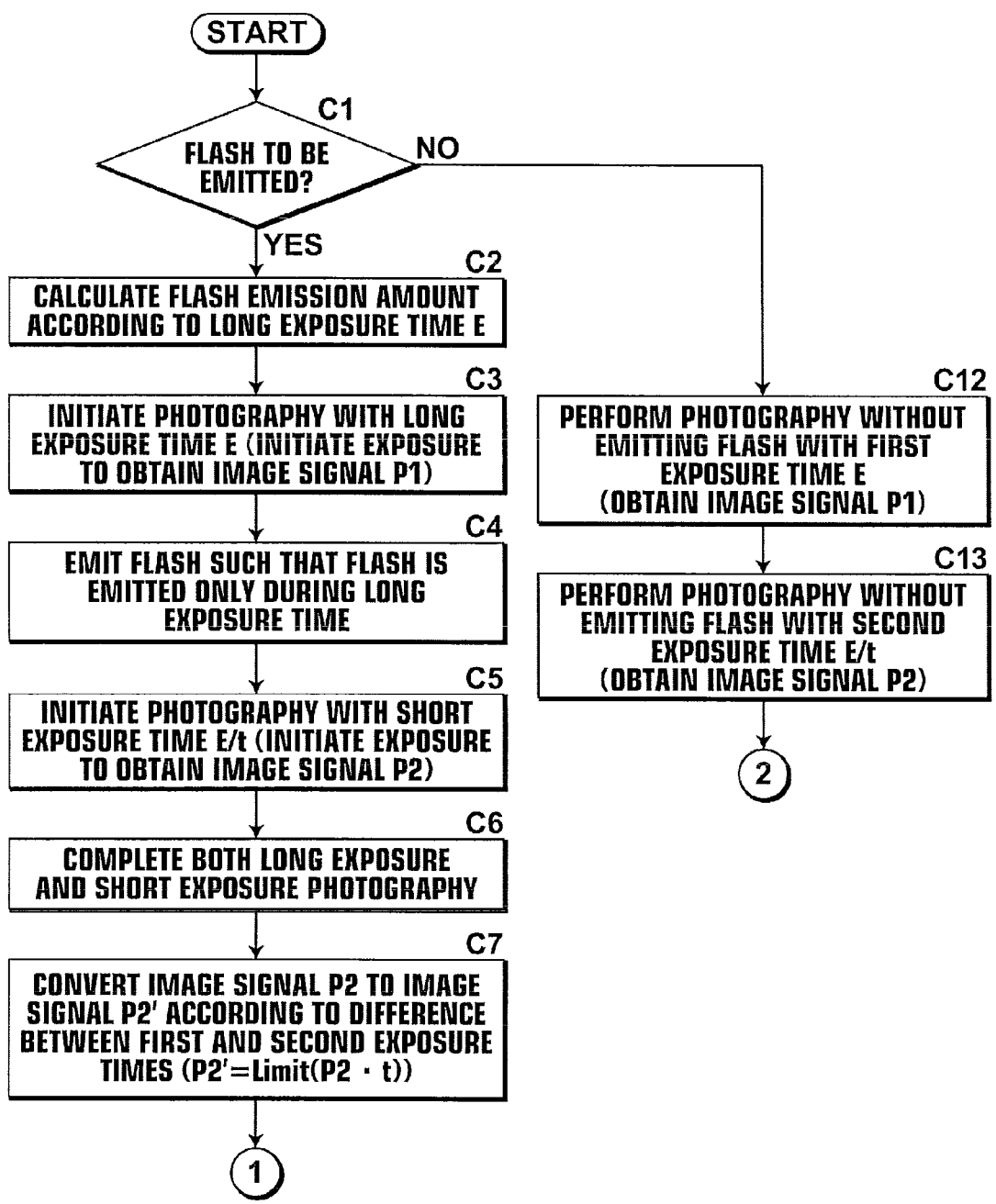
FIG. 5A is a first flow chart that illustrates the steps of a process performed by the digital camera according to a third embodiment of the present invention.
Figure 5B:
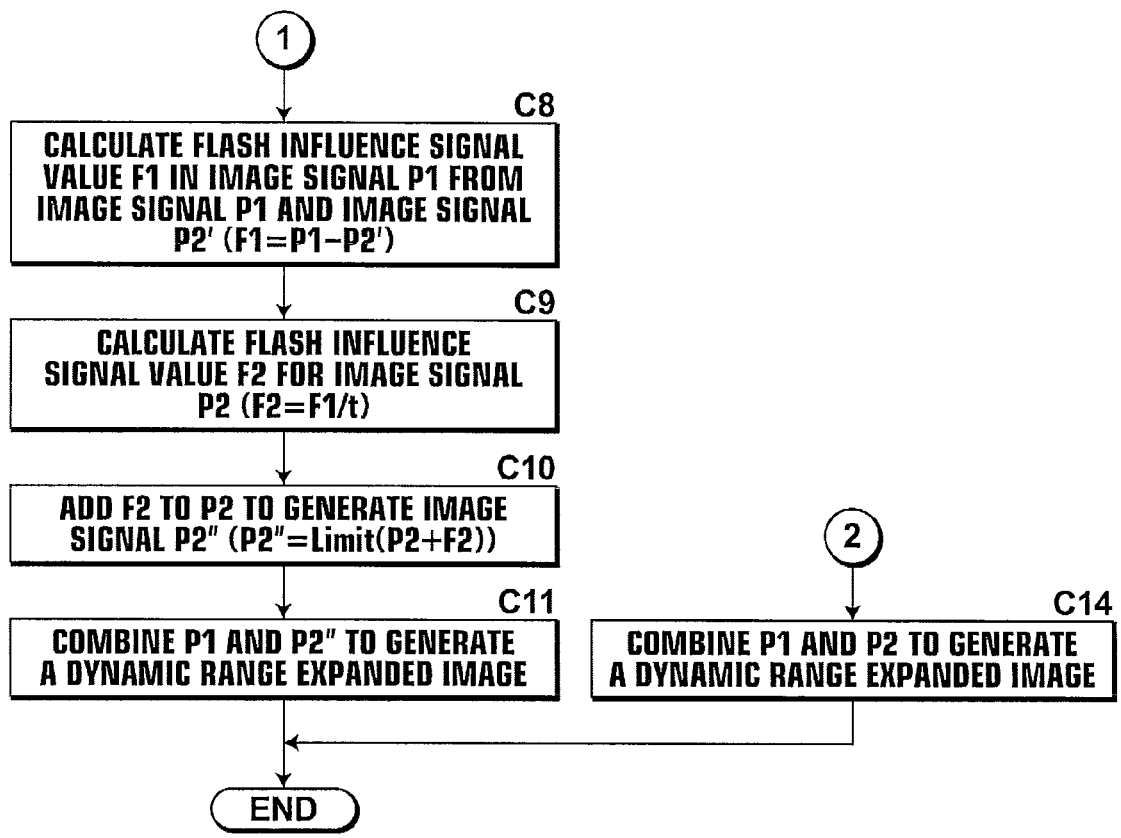
FIG. 5B is a second flow chart that illustrates the steps of a process performed by the digital camera of the third embodiment.

Next, a digital camera to which a photography apparatus according to a third embodiment of the present invention is applied will be described. FIG. 5 is a flow chart that illustrates the steps of a process performed by the digital camera of the second embodiment.

The imaging section 11 of the digital camera of the third embodiment is of a different configuration from that of the digital camera of the first embodiment. In addition, the accuracy of the process performed in the standard photography method is improved. Note that the configuration of the digital camera of the second embodiment other than the points described above is the same as that of the digital camera of the first embodiment. Therefore, detailed descriptions of the points other than the differences will be omitted.

The imaging section 11 of the third embodiment employs a CCD, in which a plurality of first light receiving elements and a plurality of second light receiving elements, which are capable of being controlled and driven independent from each other and are arranged in a predetermined arrangement. The CCD is utilized to obtain an A side image signal, mainly for obtaining data toward the low brightness side, and a B side image signal with a smaller amount of exposure than the A side image signal, mainly for obtaining data toward the high brightness side. Note that the sensitivities of the first light receiving elements and the second light receiving elements are the same. A first photography operation (to obtain the A side image signal) and a second photography operation (to obtain the B side image signal) can be performed simultaneously with different exposures, by performing the photography operations with different exposure times by employing electronic shutters.

When photography is initiated, subject data and subject field data are detected by various sensors of the detecting section 16. The CPU 10 sets how much the dynamic range of the image data set to be ultimately obtained is to be expanded from that of an image data set which is obtained by standard photography. Further, the CPU 10 judges whether flash is to be emitted, based on the subject data and the subject field data detected by the detecting section 16 (step C1).

In the case that it is judged that flash is not to be emitted at step C1, photography is performed according to a non flash emission photography method. Note that the steps of the non flash emission photography method (steps C12 through C14) are the same as those of the first embodiment, and therefore detailed descriptions thereof will be omitted.

In the case that it is judged that flash is to be emitted at Step C1, photography is performed according to a standard photography method, in which flash is emitted. Hereinafter, the standard photography method will be described in detail.

First, an exposure ratio which is necessary to obtain a desired dynamic range is determined (step C2). Then, the first photography operation (to obtain an A side image signal) with an exposure time E is initiated (step C3). Flash is emitted such that a subject is irradiated by the flash only during the first photography operation (step C4). Next, the second photography operation (to obtain a B side image signal) with an exposure time E/t is initiated (step C5). Thereafter, the first photography operation and the second photography operation are completed (step S6).

Next, an image signal P2', which is an image signal which is estimated to be obtained in the case that an image signal P2 was obtained with an exposure time E, is calculated according to the difference in exposure times of the first photography operation and the second photography operation, according to Formula (1) below (step C7).

$$P2'=\text{Limit}(P2\cdot t) \quad (1)$$

Then, a flash influence signal value F1, which is the amount of influence due to flash emission within an image signal P1 obtained by the first photography operation, is calculated based on the image signal P1 and the image signal P2' according to Formula (2) below (step C8). Then, a flash influence signal value F2, which is the amount of influence due to flash emission in the case that flash was emitted during the second photography operation is calculated, based on the flash influence signal value F1 according to Formula (3) below (step C9). Thereafter, an image signal P2", which is an image signal which is estimated to be obtained in the case that flash was emitted during the second photography operation, is calculated, based on the flash influence signal value F2 and the image signal P2 according to Formula (4) below (step C10).

$$F1=P1-P2' \quad (2)$$

$$F2=F1/t \quad (3)$$

$$P2''=\text{Limit}(P2+F2) \quad (4)$$

Finally, the data of the A side (image signal P1) is used as the low brightness side data and data of the B side (image signal P2") is used as the high brightness side data, and the A side data and the B side data are combined in the same manner as that employed in the non flash emission photography method (step C11). Thereby, a dynamic range expanded image signal Pc is obtained, based on the image signal P1 and the image signal P2".

In the case that the configuration described above is adopted as well, the same advantageous effects as those obtained by the first embodiment can be obtained.

Figure 6:
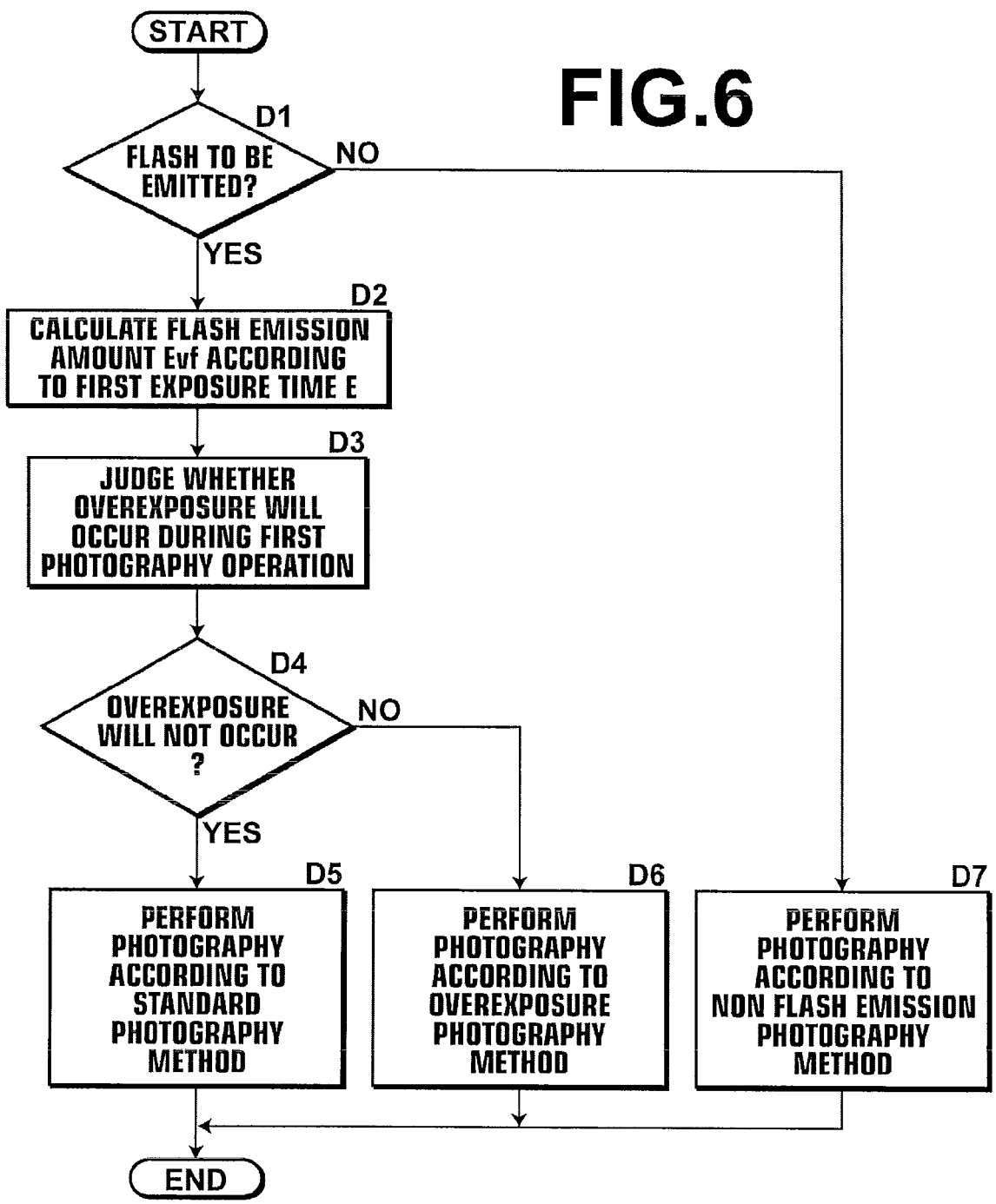
FIG. 6 is a first flow chart that illustrates the steps of a process performed by the digital camera according to a fourth embodiment of the present invention.
Figure 7:
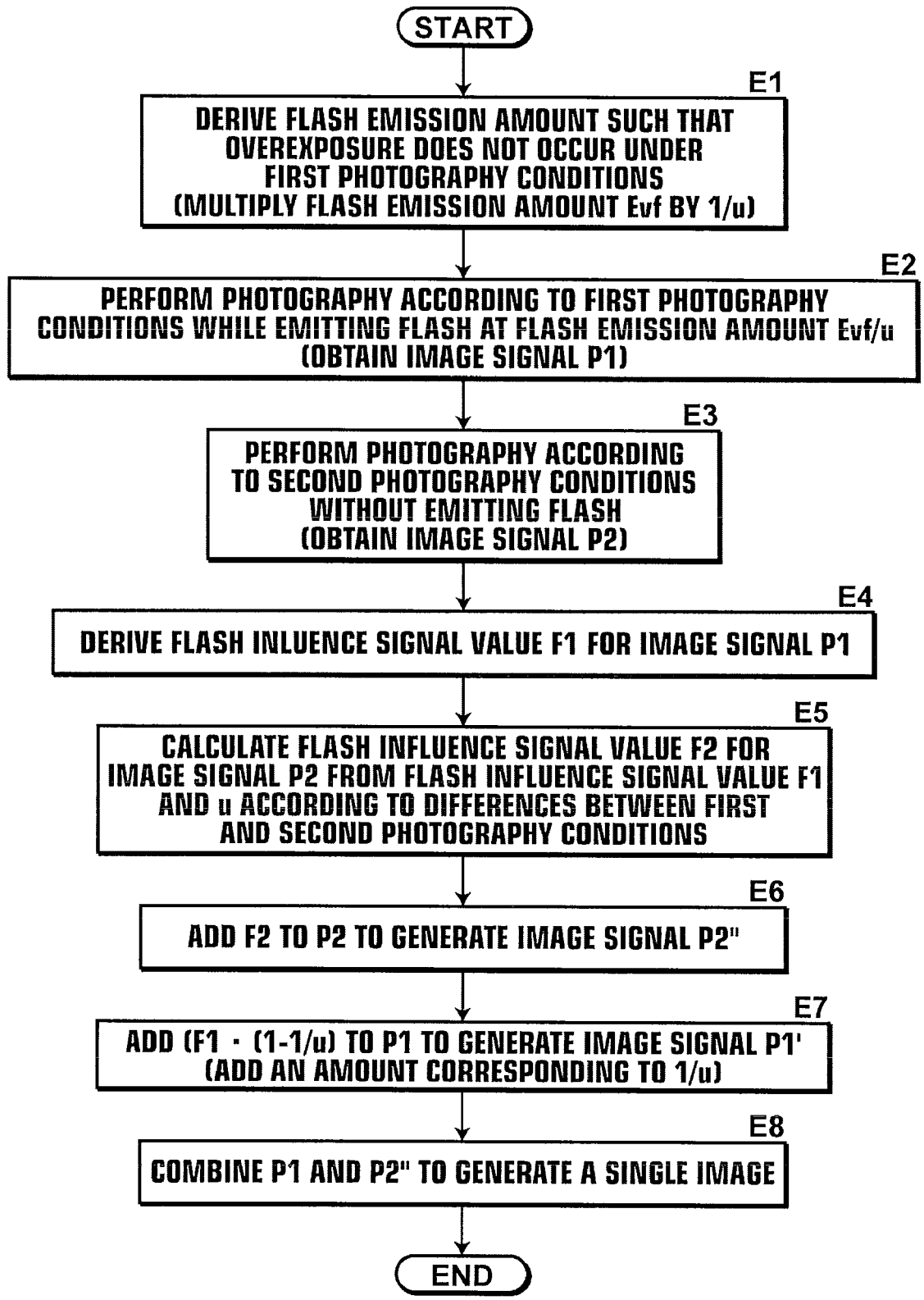
FIG. 7 is a second flow chart that illustrates the steps of a process performed by the digital camera of the fourth embodiment.

Next, a digital camera to which a photography apparatus according to a fourth embodiment of the present invention is applied will be described. FIG. 6 is a first flow chart that illustrates the steps of a process performed by the digital camera of the fourth embodiment. FIG. 7 is a second flow chart that illustrates the steps of a process performed by the digital camera of the fourth embodiment.

The digital camera of the fourth embodiment judges whether overexposure will occur within an image signal P1 obtained by a first photography operation, due to the influence of flash which is emitted during the first photography operation. If it is judged that overexposure will occur, a process dedicated to overexposure occurrence is performed. Note that the configuration of the digital camera of the fourth embodiment other than the point described above is the same as that of the digital camera of the first embodiment. Therefore, detailed descriptions of the points other than the differences will be omitted.

As illustrated in the flow chart of FIG. 6, when photography is initiated, subject data and subject field data are detected by various sensors of the detecting section 16. The CPU 10 sets how much the dynamic range of the image data set to be ultimately obtained is to be expanded from that of an image data set which is obtained by standard photography. Further, the CPU 10 judges whether flash is to be emitted, based on the subject data and the subject field data detected by the detecting section 16 (step D1).

In the case that it is judged that flash is not to be emitted at Step D1, photography is performed according to a non flash emission photography method (step D7). Note that the non flash emission photography method of the fourth embodiment is the same as that of the first embodiment, and therefore a detailed description thereof will be omitted.

In the case that it is judged that flash is to be emitted at Step D1, a flash emission amount Evf is calculated based on an exposure ratio which is necessary to obtain a desired dynamic range (step D2). Then, whether overexposure will occur in an image signal P1 obtained by the first photography operation due to flash emission at the flash emission amount Evf is judged (steps D3 and D4). If it is judged that overexposure will not occur in steps D3 and D4, photography is performed according to a standard photography method (step D5). Note that the standard photography method of the fourth embodiment is the same as that of the first embodiment, and therefore a detailed description thereof will be omitted.

If it is judged that overexposure will occur in steps D3 and D4, photography is performed according to an overexposure photography method (step D6). Hereinafter, the overexposure photography method will be described in detail.

As illustrated in the flow chart of FIG. 7, after the exposure ratio which is necessary to obtain a desired dynamic range and the flash emission amount Evf are determined, a flash emission amount Evf/u that will not cause overexposure to occur is derived (step E1). Then, a first photography operation (to obtain an A side image signal) is performed while emitting flash at the flash emission amount Evf/u (step E2). Thereafter, flash is prevented from being emitted, and a second photography operation (to obtain a B side image signal) is performed (step E3).

Next, a flash influence signal value F1, which is the amount of influence due to flash emission within an image signal P1 obtained by the first photography operation, is calculated (step E4). Then, a flash influence signal value F2, which is the amount of influence due to flash emission in the case that flash was emitted during the second photography operation is calculated, based on the difference between the imaging conditions of the first photography operation and the imaging conditions of the second photography operation (exposure ratio), the flash influence signal value F1, and a flash reduction rate 1/u (step E5). Thereafter, an image signal P2", which is an image signal which is estimated to be obtained in the case that flash was emitted during the second photography operation, is calculated, by adding the flash influence signal value F2 to an image signal P2, which is obtained by the second photography operation (step E6).

Further, an amount corresponding to the amount that flash emission was suppressed to prevent overexposure ($F1 \cdot (1-1/u)$) is added to the image signal P1, to obtain an image signal P1', which is estimated to be obtained in the case that flash emission was not suppressed during the first photography operation (step E7).

Finally, the data of the A side (image signal P1') is used as the low brightness side data and data of the B side (image signal P2") is used as the high brightness side data, and the A side data and the B side data are combined in the same manner as that employed in the non flash emission photography method (step E8). Thereby, a dynamic range expanded image signal Pc is obtained, based on the image signal P1' and the image signal P2".

In the case that the configuration described above is adopted as well, the same advantageous effects as those obtained by the first embodiment can be obtained.

Figure 8A:
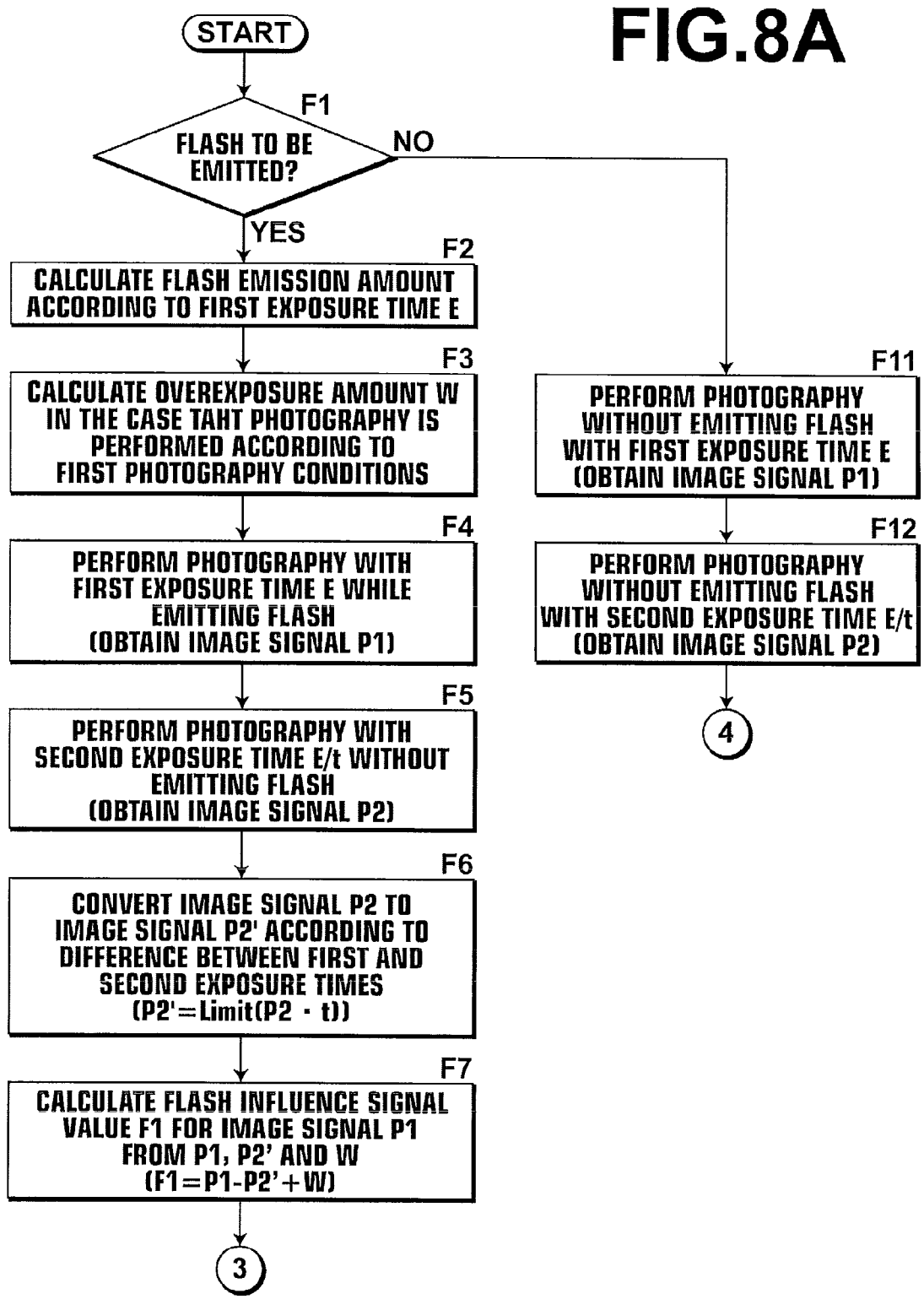
FIG. 8A is a first flow chart that illustrates the steps of a process performed by the digital camera according to a fifth embodiment of the present invention.
Figure 8B:
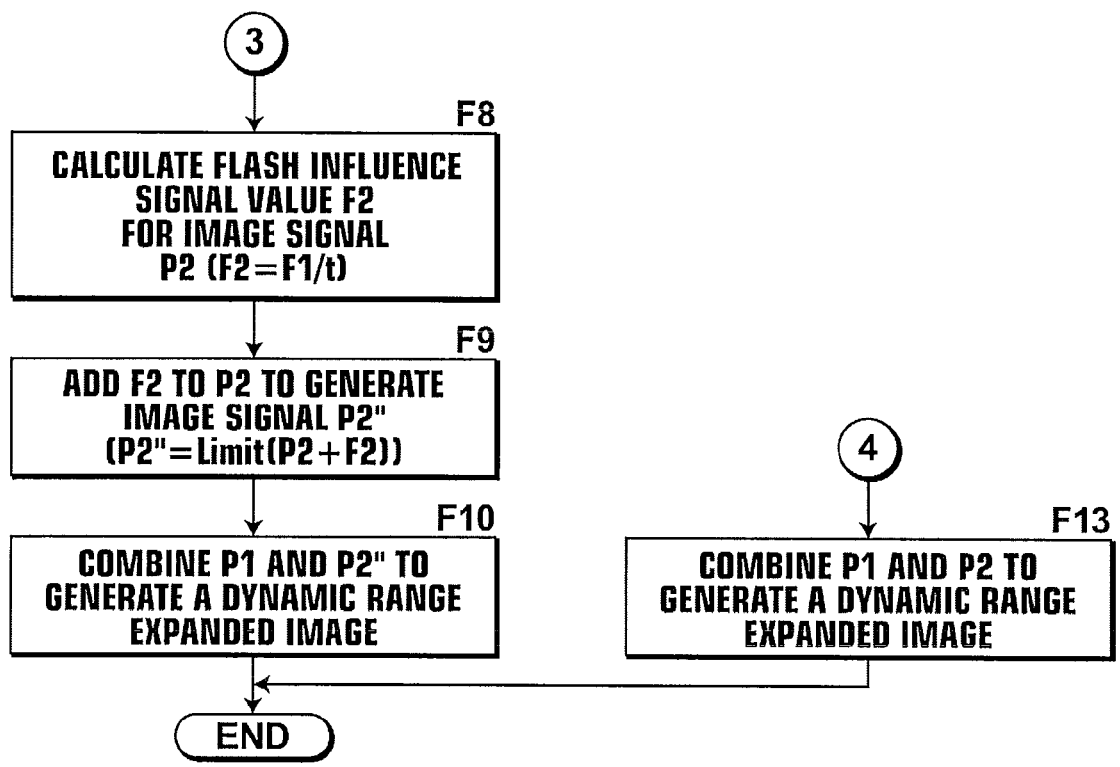
FIG. 8B is a second flow chart that illustrates the steps of a process performed by the digital camera of the fifth embodiment.

Next, a digital camera to which a photography apparatus according to a fifth embodiment of the present invention is applied will be described. FIG. 8 is a flow chart that illustrates the steps of a process performed by the digital camera of the fifth embodiment.

The process performed in the overexposure photography method of the fifth embodiment is different from that of the fourth embodiment. Note that the configuration of the digital camera of the fifth embodiment other than the point described above is the same as that of the digital camera of the first embodiment. Therefore, detailed descriptions of the points other than the differences will be omitted.

When photography is initiated, subject data and subject field data are detected by various sensors of the detecting section 16. The CPU 10 sets how much the dynamic range of the image data set to be ultimately obtained is to be expanded from that of an image data set which is obtained by standard photography. Further, the CPU 10 judges whether flash is to be emitted, based on the subject data and the subject field data detected by the detecting section 16 (step F1).

In the case that it is judged that flash is not to be emitted at Step F1, photography is performed according to a non flash emission photography method. Note that the steps of the non flash emission photography method (steps F11 through F13) are the same as those of the first embodiment, and therefore detailed descriptions thereof will be omitted.

In the case that it is judged that flash is to be emitted at step F1, photography is performed according to an overexposure photography method that takes an overexposure amount value W due to flash emission within an image signal P1 obtained by the first photography operation into consideration and performs corrections. Hereinafter, the overexposure photography method will be described in detail.

First, an exposure ratio and a flash emission amount which are necessary to obtain a desired dynamic range are determined (step F2). Then, an overexposure amount value W due to the influence of flash emission within an image signal P1 which will be obtained in the case that a first photography operation is performed with the determined flash emission amount is calculated (step F3). Then, a first photography operation (to obtain an A side image signal) is performed while emitting flash with an exposure time E (step F4). Thereafter, flash is prevented from being emitted, and a second photography operation (to obtain a B side image signal) is performed with an exposure time E/t (step F5).

The method for calculating the overexposure amount is not particularly limited, and any method may be employed. An example of such a method is as follows. A preliminary flash emission image, which is obtained by performing a photography operation while suppressing the flash emission amount such that overexposure does not occur, is compared against a non flash emission image to calculate a flash influence signal value during preliminary flash emission. Then, the flash influence signal value may be converted to a standard amount of flash emission, to derive the overexposure amount W.

Next, an image signal P2', which is an image signal which is estimated to be obtained in the case that an image signal P2 was obtained with an exposure time E, is calculated according to the difference in exposure times of the first photography operation and the second photography operation, according to Formula (1) below (step F6).

$$P2' = \text{Limit}(P2 \cdot t) \quad (1)$$

Next, a flash influence signal value F1, which is the amount of influence due to flash emission within the image signal P1 obtained by the first photography operation, is calculated based on the image signal P1, the image signal P2', and the overexposure amount value W according to Formula (5) below (step F7). Then, a flash influence signal value F2, which is the amount of influence due to flash emission in the case that flash was emitted during the second photography operation is calculated, based on the flash influence signal value F1 according to Formula (3) below (step F8). Thereafter, an image signal P2″, which is an image signal which is estimated to be obtained in the case that flash was emitted during the second photography operation, is calculated, based on the flash influence signal value F2 and the image signal P2 according to Formula (4) below (step F9).

$$F1 = P1 - P2' + W \quad (5)$$

$$F2 = F1/t \quad (3)$$

$$P2'' = \text{Limit}(P2 + F2) \quad (4)$$

Finally, the data of the A side (image signal P1) is used as the low brightness side data and data of the B side (image signal P2″) is used as the high brightness side data, and the A side data and the B side data are combined in the same manner as that employed in the non flash emission photography method (step F10). Thereby, a dynamic range expanded image signal Pc is obtained, based on the image signal P1 and the image signal P2″.

In the case that the configuration described above is adopted as well, the same advantageous effects as those obtained by the first embodiment can be obtained.

The preferred embodiments of the present invention have been described above. However, the present invention is not limited to the above embodiments. For example, the "image signal P2″, which is an image signal which is estimated to be obtained in the case that flash was emitted during the second photography operation" may be employed in various other types of image processes in addition to the aforementioned process for generating dynamic image expanded image signals. An example of another image process that may employ the image signal P2″ is a multi frame process, in which an image having a shallow subject field depth or an image having a deep subject field depth is generated based on image signals that represent a plurality of frames.

What is claimed is:

1. A photography apparatus, comprising:
   imaging means for performing at least two photography operations including a first photography operation and a second photography operation with different photography conditions for a single subject, and obtaining a plurality of image signals corresponding to the plurality of photography operations;
   light emitting means, for emitting flash toward the subject;
   image signal processing means, for processing the plurality of image signals; and
   control means, for controlling the imaging means, the light emitting means, and the image signal processing means such that they perform photography operations according to a standard photography method, comprising the steps of:
      performing the first photography operation while emitting flash;
      performing the second photography operation while preventing the flash from being emitted;
      calculating a flash influence signal value F1, which is the amount of influence due to flash emission within an image signal P1 obtained by the first photography operation;
      calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and
      obtaining an image signal P2″, which is an image signal which is estimated to be obtained in the case that flash was emitted during the second photography operation, by adding the flash influence signal value F2 to an image signal P2 obtained by the second photography operation.

2. A photography apparatus as defined in claim 1, wherein:
   the image signal processing means obtains a dynamic range expanded image signal Pc based on the image signal P1 and the image signal P2.

3. A photography apparatus as defined in claim 1, wherein:
   the imaging means is an imaging element equipped with a great number of first light receiving elements and second light receiving elements that photoelectrically convert light from subjects, which are capable of being controlled so as to be driven independently from each other and are arranged in a predetermined arrangement.

4. A photography apparatus, comprising:
   imaging means for performing at least two photography operations including a first photography operation and a second photography operation with different photography conditions for a single subject, and obtaining a plurality of image signals corresponding to the plurality of photography operations;
   light emitting means, for emitting flash toward the subject;
   image signal processing means, for processing the plurality of image signals; and
   control means, for controlling the imaging means, the light emitting means, and the image signal processing means such that they perform photography operations according to an overexposure photography method, comprising the steps of:
      performing the first photography operation while emitting flash;
      performing the second photography operation while preventing the flash from being emitted;
      calculating an overexposure amount value W, which is the amount of overexposure due to flash emission within an image signal P1 obtained by the first photography operation;
      calculating a flash influence signal value F1, which is the amount of influence due to flash emission within an image signal P1 obtained by the first photography operation, based on the overexposure value W;
      calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and
      obtaining an image signal P2″, which is an image signal which is estimated to be obtained in the case that flash was emitted during the second photography operation, by adding the flash influence signal value F2 to an image signal P2 obtained by the second photography operation.

5. A photography apparatus as defined in claim 4, wherein:
   the image signal processing means obtains a dynamic range expanded image signal Pc based on the image signal P1 and the image signal P2.

6. A photography apparatus as defined in claim 4, wherein:
   the imaging means is an imaging element equipped with a great number of first light receiving elements and second light receiving elements that photoelectrically convert light from subjects, which are capable of being controlled so as to be driven independently from each other and are arranged in a predetermined arrangement.

7. A photography apparatus, comprising:

imaging means for performing at least two photography operations including a first photography operation and a second photography operation with different photography conditions for a single subject, and obtaining a plurality of image signals corresponding to the plurality of photography operations;

light emitting means, for emitting flash toward the subject;

image signal processing means, for processing the plurality of image signals;

judging means, for judging whether overexposure will occur in an image signal P1 obtained by the first photography operation due to the influence of flash emitted during the first photography operation;

control means, for controlling the imaging means, the light emitting means, and the image signal processing means such that they perform photography operations according to a standard photography method, comprising the steps of:

performing the first photography operation while emitting flash;

performing the second photography operation while preventing the flash from being emitted;

calculating a flash influence signal value F1, which is the amount of influence due to flash emission within an image signal P1 obtained by the first photography operation;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation, in the case that the judging means judges that overexposure will not occur, and for controlling the imaging means, the light emitting means, and the image signal processing means such that they perform photography operations according to an overexposure photography method, comprising the steps of:

performing the first photography operation while emitting flash;

performing the second photography operation while preventing the flash from being emitted;

calculating an overexposure amount value W, which is the amount of overexposure due to flash emission within an image signal P1 obtained by the first photography operation;

calculating a flash influence signal value F1, which is the amount of influence due to flash emission within an image signal P1 obtained by the first photography operation, based on the overexposure value W;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation, in the case that the judging means judges that overexposure will occur.

8. A photography apparatus as defined in claim 7, wherein:

the image signal processing means obtains a dynamic range expanded image signal Pc based on the image signal P1 and the image signal P2.

9. A photography apparatus as defined in claim 7, wherein:

the imaging means is an imaging element equipped with a great number of first light receiving elements and second light receiving elements that photoelectrically convert light from subjects, which are capable of being controlled so as to be driven independently from each other and are arranged in a predetermined arrangement.

10. A photography method, for performing at least two photography operations including a first photography operation and a second photography operation with different photography conditions for a single subject, obtaining a plurality of image signals corresponding to the plurality of photography operations, and processing the plurality of obtained image signals according to a standard photography method, comprising the steps of:

performing the first photography operation while emitting flash;

performing the second photography operation while preventing the flash from being emitted;

calculating a flash influence signal value F1, which is the amount of influence due to flash emission within an image signal P1 obtained by the first photography operation;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation.

11. A photography method as defined in claim 10, wherein:

a dynamic range expanded image signal Pc is obtained based on the image signal P1 and the image signal P2".

12. A photography method, for performing at least two photography operations including a first photography operation and a second photography operation with different photography conditions for a single subject, obtaining a plurality of image signals corresponding to the plurality of photography operations, and processing the plurality of obtained image signals according to an overexposure photography method, comprising the steps of:

performing the first photography operation while emitting flash;

performing the second photography operation while preventing the flash from being emitted;

calculating an overexposure amount value W, which is the amount of overexposure due to flash emission within an image signal P1 obtained by the first photography operation;

calculating a flash influence signal value F1, which is the amount of influence due to flash emission within an image signal P1 obtained by the first photography operation, based on the overexposure value W;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation.

13. A photography method as defined in claim 12, wherein:
a dynamic range expanded image signal Pc is obtained based on the image signal P1 and the image signal P2".

14. A photography method, for performing at least two photography operations including a first photography operation and a second photography operation with different photography conditions for a single subject, obtaining a plurality of image signals corresponding to the plurality of photography operations, and processing the plurality of obtained image signals, comprising the steps of:

judging whether overexposure will occur in an image signal P1 obtained by the first photography operation due to the influence of flash emitted during the first photography operation;

performing the first photography operation while emitting flash;

performing the second photography operation while preventing the flash from being emitted;

calculating a flash influence signal value F1, which is the amount of influence due to flash emission within an image signal P1 obtained by the first photography operation;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation, in the case that it is judged that overexposure will not occur; and performing the first photography operation while emitting flash;

performing the second photography operation while preventing the flash from being emitted;

calculating an overexposure amount value W, which is the amount of overexposure due to flash emission within an image signal P1 obtained by the first photography operation;

calculating a flash influence signal value F1, which is the amount of influence due to flash emission within an image signal P1 obtained by the first photography operation, based on the overexposure value W;

calculating a flash influence signal value F2, which is the amount of influence due to flash emission in the case that flash was emitted during the second photography operation, based on the differences between the imaging conditions of the first photography operation and the imaging conditions of the second photography operation and the flash influence signal value F1; and obtaining an image signal P2", which is an image signal which is estimated to be obtained in the case that flash was emitted during the second photography operation, by adding the flash influence signal value F2 to an image signal P2 obtained by the second photography operation, in the case that it is judged that overexposure will occur.

15. A photography method as defined in claim 14, wherein:
a dynamic range expanded image signal Pc is obtained based on the image signal P1 and the image signal P2".

* * * * *